(No Model.)
N. P. BOWSHER.
SPLIT PULLEY.
No. 307,171. Patented Oct. 28, 1884.
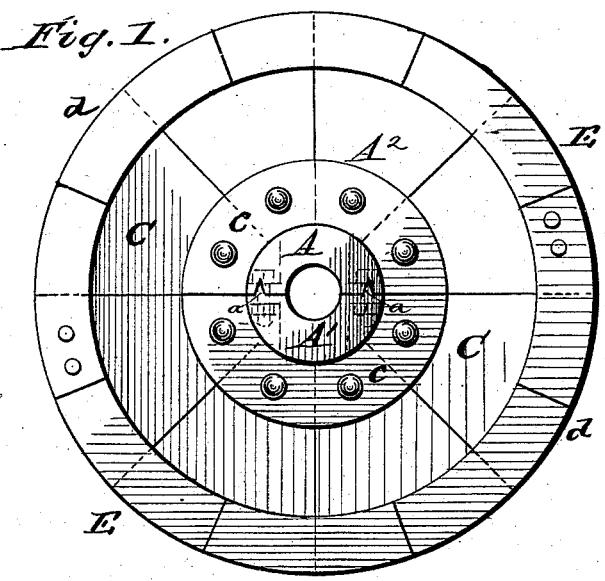
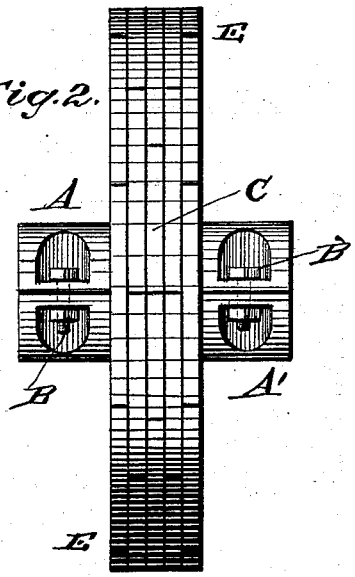
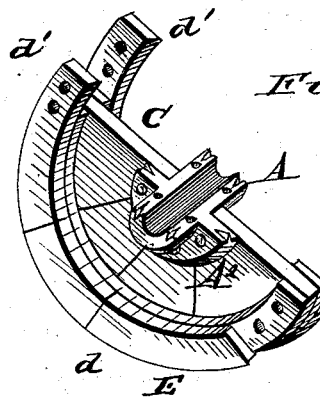
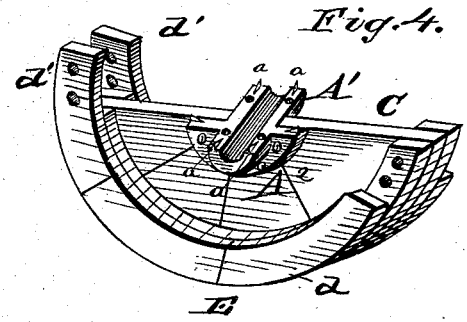
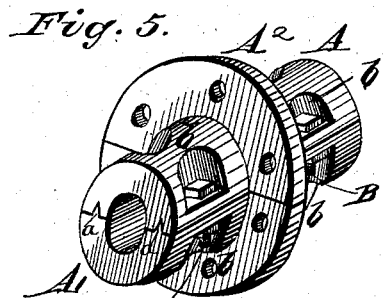
WITNESSES
Phil C. Dietrich.
W. R. Keyworth.
INVENTOR
Nelson P. Bowsher
by:
J. H. Alexander
Attorney

UNITED STATES PATENT OFFICE.

NELSON P. BOWSHER, OF SOUTH BEND, INDIANA.

SPLIT PULLEY.

SPECIFICATION forming part of Letters Patent No. 307,171, dated October 28, 1884.

Application filed May 17, 1884. (No model.)

*To all whom it may concern:*

Be it known that I, NELSON P. BOWSHER, of South Bend, in the county of St. Joseph and State of Indiana, have invented certain new and useful Improvements in Split Pulleys; and I do hereby declare that the following is a full, clear, and exact description thereof, reference being had to the accompanying drawings, and to the letters of reference marked thereon, which form part of this specification, in which—

Figure 1 is a side view of my improved split pulley complete. Fig. 2 is an edge view of the same. Figs. 3 and 4 are perspective views of the two halves of the pulley. Fig. 5 is a perspective view of the hub of the pulley. Fig. 6 is a view of the divided collar.

This invention relates to improvements on the construction of what are known as "split" or "compound" pulleys—that is to say, pulleys which are made up of a number of segments firmly united; and it consists in a split pulley which is composed of sections or segments constructed and secured together in a novel manner, whereby great strength and accuracy are obtained, as will be fully understood from the following description, when taken in connection with the annexed drawings.

The hub of my pulley is composed of two longitudinally-divided halves, A A', having a flange, A². These halves are constructed with prismatic grooves and tenons $a$, which cause the two halves to fit together truly in the act of securing them together by means of bolts and nuts. I form recesses $b$ in the halves on opposite sides of the flange A², for receiving the said bolts and nuts, and thus preventing them from doing injury to a belt should it casually slip off the pulley.

C designates the web of the pulley, which is composed of a number of segments, all of which are rigidly secured to the flange A² of the hub, and also to a split collar, D, by means of bolts B. The collar D is made of two halves, and is used to re-enforce or solidify the joining of the hub-sections and web. This collar is applied on the hub on the opposite side of the web to the flange A², with its line of division perpendicular to the line of division of the hub, or so that these lines of division shall not coincide. I thus resist any strain which would tend to separate the hub-sections. The rim E of the pulley is built up of any desired number and width of segments, $d\ d'$, which are secured to the web and to each other. The last two segments $d'\ d'$ on each half of the pulley are made to overlap on the adjacent rim, as indicated in the drawings. When the halves of the pulley are put together and rigidly secured by means of screws, the rim is firmly bound and held true and secure from warping or shrinking, or from separating by strain.

It will be observed that the layers of segments forming the rim of the pulley are arranged so as to break joints with each other, and also with segments or sectors forming the web.

Having described my invention, I claim as new—

1. A split or sectional pulley consisting of the following elements combined: the overlapping and interlocking segments forming the rim, the segments secured thereto forming the web, a two-part flanged hub having interlocking grooves and tenons, and a two-part collar, D, all constructed and adapted to operate substantially as and for the purposes described.

2. In a split or sectional pulley, the combination of the overlapping and interlocking segments forming the rim, the segments secured thereto forming the web, a two-part flanged hub having interlocking grooves and tenons, recesses $b$ and bolt and nut fastenings seated therein, and the two-part collar with its line of division at right angles to the line of division of the hub, all constructed and adapted to operate substantially in the manner and for the purposes described.

In testimony that I claim the foregoing as my own I affix my signature in presence of two witnesses.

NELSON P. BOWSHER.

Witnesses:
 JAMES DU SHANE,
 WILLIS A. BUGBEE.